United States Patent [19]

Masumura et al.

[11] Patent Number: 5,608,881
[45] Date of Patent: Mar. 4, 1997

[54] MICROCOMPUTER SYSTEM FOR ACCESSING HIERARCHICAL BUSES

[75] Inventors: Shigeki Masumura, Kodaira; Hideo Nakamura, Tokyo; Kouki Noguchi, Kokubunji; Shumpei Kawasaki, Kodaira; Kaoru Fukada, Koganei; Yasushi Akao, Kokubunji, all of Japan

[73] Assignees: Hitachi, Ltd.; Hitachi ULSI Engineering Corporation, both of Tokyo, Japan

[21] Appl. No.: 143,142

[22] Filed: Oct. 29, 1993

[30] Foreign Application Priority Data

Nov. 6, 1992 [JP] Japan .................................. 4-296779

[51] Int. Cl.⁶ .......................................... G06F 13/00
[52] U.S. Cl. .......................................... 395/306; 395/287
[58] Field of Search .................................. 395/325, 800, 395/250, 287, 290, 300, 306, 308, 309

[56] References Cited

U.S. PATENT DOCUMENTS

| | | | |
|---|---|---|---|
| 4,205,373 | 5/1980 | Shah et al. | 395/308 |
| 4,716,525 | 12/1987 | Gilanyi et al. | 395/250 |
| 4,750,112 | 6/1988 | Jones et al. | 395/375 |
| 4,864,496 | 9/1989 | Triolo et al. | 395/325 |
| 4,890,224 | 12/1989 | Fremont | 395/325 |
| 4,912,633 | 3/1990 | Schweizer et al. | 395/325 |
| 4,948,271 | 9/1990 | Yoshida et al. | 395/308 |
| 4,975,838 | 12/1990 | Mizuno et al. | 395/325 |
| 4,994,963 | 2/1991 | Rorden et al. | 395/325 |
| 5,093,780 | 3/1992 | Sunahara | 395/800 |
| 5,274,783 | 12/1993 | House et al. | 395/325 |
| 5,280,589 | 1/1994 | Nakamura | 395/309 |
| 5,305,442 | 4/1994 | Pedersen et al. | 395/290 |
| 5,345,566 | 9/1994 | Tanji et al. | 395/325 |
| 5,410,654 | 4/1995 | Foster et al. | 395/325 |
| 5,434,983 | 7/1995 | Yaso et al. | 395/308 |
| 5,463,740 | 10/1995 | Taniai et al. | 395/308 |

*Primary Examiner*—Ayaz R. Sheikh
*Attorney, Agent, or Firm*—Antonelli, Terry, Stout & Kraus, LLP

[57] ABSTRACT

In a microcomputer system, an access operation is executed in a pipeline mode via buses to which bus masters are connected, and a control of the pipeline execution is performed by a bus controller. Furthermore, an access for delaying this pipeline operation is carried out by low-level of hierarchical buses connected by a buffer and a low-level bus controller.

9 Claims, 5 Drawing Sheets

MICROCOMPUTER SYSTEM FOR ACCESSING HIERARCHICAL BUSES

BACKGROUND OF THE INVENTION

The present invention generally relates to a microcomputer system which includes a bus master, a memory and peripheral function units, and buses connected to these units for transferring data among them. More specifically, the present invention is related to a bus operating method for transferring and fetching data among these units.

In a microcomputer system constructed of a processor such as a microcomputer functioning as a bus master, a memory and peripheral functional units, and buses, the data transfer/fetch operations must be carried out among these units.

On one hand, to operate a logic circuit such as a microcomputer at a high speed, there are a first method for operating the logic circuit at the high speed by increasing the operation frequency, and a second method for effectively realizing a high-speed operation by a pipeline process.

In accordance with the first method, there is a limitation in view of device, and generally speaking, cost of the overall system becomes expensive. Thus, normally, the first method is combined with the second method within a balanceable range between cost and performance.

On the other hand, the CISC (complex instruction set computer) system containing a variety of instructions with high performance, and the RISC (reduced instruction set computer) system for executing simple instructions at high speeds are known as the microcomputer system.

In the microcomputer according to the RISC method, a large number of instructions are executed in 1 clock cycle at a high speed by the pipeline-mode execution.

However, in the microcomputer according to the RISC method, frequencies of instruction fetch and of data fetch are high, and then the operation frequency band of the bus control circuit for transferring and fetching the data among the memory and the peripheral function units, may greatly influence performance of the overall system. As a consequence, in such a system with employment of a microcomputer by way of the RISC method, a high-speed bus transfer is required and thus, memories and peripheral function units which can be operated at high speeds are necessarily required. However, actually, all of the memories and peripheral function units connected to this highspeed bus cannot be always operated at the same highspeed as the microcomputer functioning as the bus master for this system. This is because in the specifically highspeed-designed microcomputer, the internal operation is performed in a pipeline mode, and time allowed to one of pipeline stages is equal to only 1 time period of the basic clock employed in this microcomputer system.

When the microcomputer is operated in such a manner at the maximum speed, the internal pipelines are sequentially executed without occurrences of disturbance, and it is extremely difficult that the buses connected to it, and all of the memories as well as peripheral function units are operated without any delay within 1 time period of the basic clock for this system. As a consequence, such an external interface must be provided within the microcomputer, and this external interface performs controls related to various access cycles and various access data sizes in order to execute various access operations on the buses of this system in conjunction with the pipeline control circuit.

As described above, according to the above-mentioned prior art, there is a first problem such that performance of the overall system is determined by the operation speed of bus, and the operation speeds of memories and also peripheral function units, which are accessed by this bus, namely the access time to read or write data.

Also, according to the above-explained prior art, since the bus is controlled by the external interface in conformity to the internal pipeline operation of the microcomputer, another interface corresponding to accesses by all memories and peripheral function units, which may be potentially connected to this bus, must be employed in addition to the originally required external interface. As a result, there is a second problem that the external interface becomes complex and the logic scale would be increased.

Furthermore, there is a third problem that when another system is built by using this microcomputer, the bus interface specifications of this system are restricted. There is a fourth problem that in such a system with having a plurality of bus masters, external interface circuits corresponding to the pipeline operations within the respective bus masters are required, the quantity of which is equal to that of the bus masters.

SUMMARY OF THE INVENTION

An object of the present invention is to provide such a bus operation method for a microcomputer system capable of increasing effective operation speeds of buses, memories, and peripheral function units, capable of simplifying a bus interface provided on the side of a bus master, and further capable of readily changing the interface specifications for the memories and the peripheral function units without modifying the interface circuit provided on the side of the bus master.

The above-described object may be achieved by employing such a bus controller for performing an access operation effected via the bus in a pipeline manner, for constructing the bus in a hierarchical structure, which executes the access operation in accordance with an operation speed of an accessed device, and further for separately controlling the buses in the respective hierarchical stages within a certain range.

That is, according to the basic technical idea of the present invention, the above-described object can be achieved by providing a hierarchical bus and a hierarchical controller corresponding to this bus in an overall system. These bus and controller are operated as follows. A first level of hierarchical bus executes the access operation at a high speed in a pipeline manner, and a control for this pipeline execution is such that the first-level bus controller can be independently controlled within a certain scope with respect to the bus master.

Furthermore, a slow-speed access operation which may delay a highspeed pipeline execution performed in the first level of hierarchical bus, is transferred from the first level of hierarchical bus to the second level of hierarchical bus.

In addition, a further slow-speed access operation transfers its execution control to a further lower-level bus.

A microprocessor system according to the typical embodiment of the present invention comprises:

a bus master (101);

a first address bus (113) to which an address from the bus master is transferred;

a first data bus (114) to which data from the bus master is transferred;

a high-speed memory (115) coupled with the first address bus and the first data bus;

a first bus buffer (112) coupled with the first address bus and the first data bus;

a second address bus (123) coupled via the first bus buffer to the first address bus;

a second data bus (124) coupled via the first bus buffer to the first data bus;

a low-speed device (125, 126, 127) coupled with the second address bus and the second data bus;

a first bus controller (111) for granting bus ownerships of the first address bus and the first data bus in response to an access request issued from the bus master; and a second bus controller (121) for granting bus ownerships of the second address bus and the second data bus in response to the access request issued from the bus master.

The above-described bus master (101) is arranged in such a manner that a pipeline operation is executed with respect to said access request and to the output of the address to said first address bus.

The above-mentioned high-speed memory (115) is arranged in such a manner that a pipeline operation is executed with respect to a memory selecting operation in accordance with an address decoding and to data read from the selected memory.

At least one of said first and second bus controllers controls said bus master and said first bus buffer in such a manner that when an access object of said access request from said bus master is said low-speed device, both of said bus ownerships of said first address bus and said first data bus, and also said bus ownerships of said second address bus and said second data bus are granted to said bus master, said bus master suspends an advance of said pipeline operation, and said first bus buffer holds said address of said first address bus for a predetermined cycle, thereby transferring said address to said second address bus.

First, the operation speeds of the buses, and also the operation speeds of the memories and the peripheral function units, which are accessed by these buses, can be effectively increased by way of the first level of hierarchical bus for executing the access at high speeds in the pipeline mode. As a result, it is possible to solve the above-explained first problem that performance of the overall system is determined by the accessing time required for reading, or writing the data.

Furthermore, the pipeline execution for the memory accessing operation by the first level of hierarchical bus is controlled by the first-level bus controller of exclusive use, so that the bus master corresponding to the major portion of the accessing operation is merely equipped with the circuit for outputting the address and for inputting/outputting the data in response to the bus instruction to initiate the memory accessing operation of the first-level bus controller and also the control signal derived from the first-level bus controller. That is, the internal pipeline operation control of the bus master of the microcomputer and the like is separated from the pipeline operation control of the memory accessing operation, whereby the bus mater merely realizes a simple interface. In particular, when the memory accessing operation is executed in the pipeline manner, a total number of control conditions can be reduced which are established from various combinations between the pipeline executions of the memory accessing operation and the internal pipeline execution conditions of the bus master. This may reduce the control logic scale to execute the memory accessing operation, so that the above-explained second problem, namely an increase of logic scale can be solved.

In addition, it is possible to obtain another merit similar to the previous merit achieved when the controls of the memory accessing operations are separated with respect to the first-level bus controller and the bus master, since such a bus controller is employed which can construct the bus in a hierarchical form, for executing the accessing operation in accordance with the operation speed of the device to be accessed, and which further can independently control the respective hierarchical leveled buses within a predetermined scope, respectively.

To construct another system by using the bus master modules such as the microcomputer corresponding to the bus interface according to the present invention, it is only required to modify the function specification of either the first-level bus controller, or the lower-level bus controller. Accordingly, it is possible to solve the above-explained problem such that when another system is constructed, the bus interface specification of this system is limited.

Moreover, there is another advantage when the internal pipeline operation control of the bus master of the microcomputer, or the like is separated from the accessing operation control of the memory in such a system that a plurality of bus masters are employed. That is, it is not required to employ complex bus interfaces having similar functions in each of bus masters, each of these bus masters merely employs a simple bus interface, so that only a single bus control for wholly controlling the memory access executions is required in this system. Therefore, it is possible to solve the above-explained fourth problem such that the external interface circuits equipped with all of memory accessing functions must be employed, the total number of which are identical to that of the bus masters. This implies that even in such a case when the specifications of the internal pipeline operations of the respective bus masters are different from each other, if the above-described simple interface is equipped, then the bus masters can be connected to the first level of hierarchical bus which is operated at high speed in accordance with the present invention.

With the above-described structures, in accordance with the present invention, it is possible to provide such a bus operation system, a memory/peripheral function control system, a microcomputer, and a system constructed of these units. That is, in the bus operation system, the operation speeds of the bus, memory and peripheral function units connected to this bus are increased, the bus interface provided on the side of the bus master is made simpler, and also the interface specifications of the memory/peripheral function units connected to this bus can be easily changed without modifying the interface circuit provided on the side of the bus master. In the memory/peripheral function units control system, the operations of this bus as well as the memory and peripheral function units connected to this bus can be controlled. In the microcomputer, this microcomputer can be operated in conformity to the bus operation system. Furthermore, in the system, this system can be arranged by utilizing these units.

Other objects of the present invention and the features thereof will be apparent from the following embodiments.

DESCRIPTION OF THE PREFERRED EMBODIMENTS

Referring now to drawings, an embodiment of the present invention will be described in detail.

SYSTEM ARRANGEMENT

Figure 1:
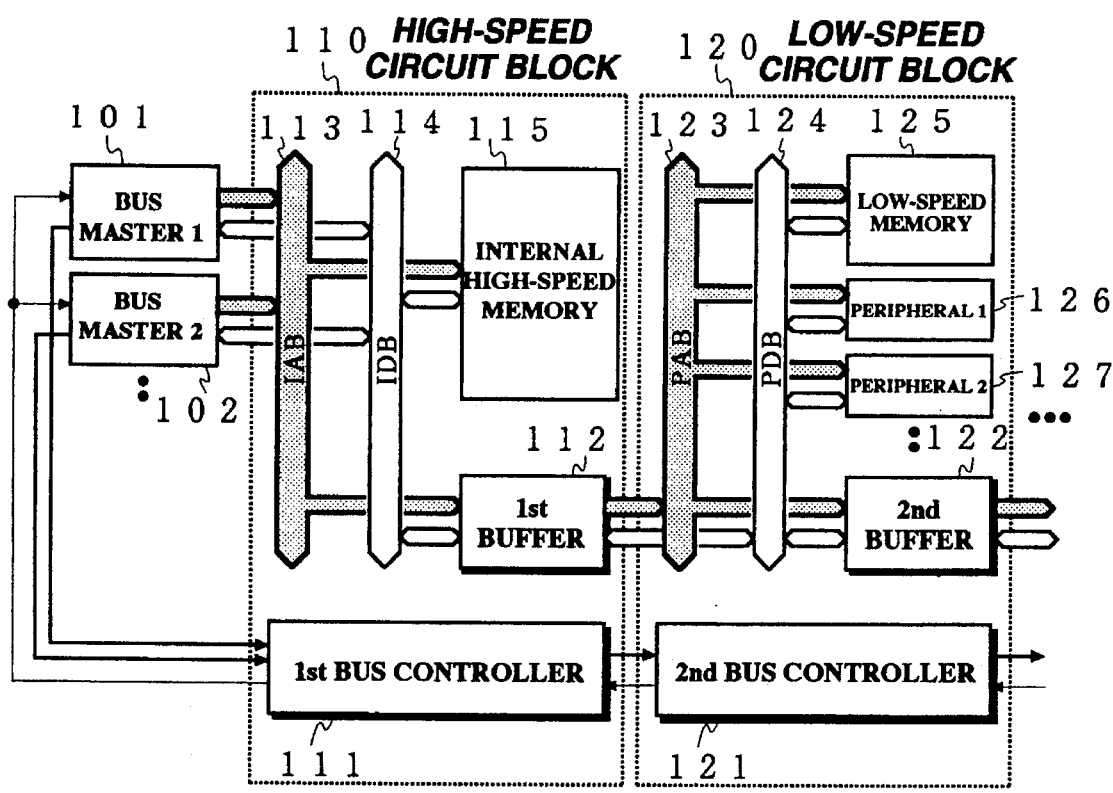
FIG. 1 schematically shows a constructive diagram of a microcomputer system with employment of a pipeline control bus according to an embodiment of the present invention.

FIG. 1 schematically illustrates one example of a system arrangement of a microcomputer system with employment of a pipeline control bus according to an embodiment of the present invention.

BUS MASTER

Bus masters 101 and 102 are modules for reading and writing data with respect to a memory employed within the system and other peripheral function units as in a processor such as a microcomputer, and DMAC (direct memory access controller). These bus masters 101 and 102 transfer and fetch data via a bus which can be roughly classified into address buses 113, 123 and data buses 114, 124 when the data are read and written with respect to the memories 115, 125 employed within the system, and other peripheral function units 126, 127.

HIERARCHICAL BUS

The bus is connected to the respective modules to which the bus masters 101 and 102 can access, and is roughly separated into two hierarchies together with an address bus and a data bus. This is, as one reason, to effectively access a plurality of modules whose access times and access frequencies are different from each other, and also as another reason, to make a hierarchy of the overall pipeline control related to the bus interface, thereby simplifying the pipeline control.

A first level of hierarchical address bus 113 is called "IAB (internal address bus)", and a first level of hierarchical data bus 114 is termed "IDB (internal data bus)".

HIGH-SPEED MEMORY

The bus masters 101 and 102 within the chip continuously can access at a high speed an internal highspeed memory 115 connected to the first level of hierarchical bus by directly driving the first level of hierarchical address bus 113 and the first level of hierarchical data bus 114. Otherwise, in case of dispersive memory accesses, in most case, it is possible to maintain high execution performance as the overall program in accordance with the instruction execution method by a delayed load. Here, the delayed load implies that when the bus master reads out data from a storage device such as a memory, an instruction or the like which does not give an adverse influence to desired data by utilizing a time interval during which the desired data is read into the bus master.

A memory access operation in which the bus master 101 or 102 reads and writes the data via IAB and IDB to the internal high-speed memory 115, is executed in a pipeline form, and then the pipeline execution of this memory access is controlled by a first-level bus controller 111.

FIRST-LEVEL BUS CONTROLLER

A scope for directly controlling a bus cycle by the first-level bus controller 111 in connection with the memory access, is a circuit block 110 shown in FIG. 1, and this circuit block 110 is a scope directly connected by the first level of hierarchical buses IAB and IDB. It should be noted that the pipeline execution of the memory access will be described in detail with reference to drawings subsequent to FIG. 2.

Here, starting of the memory access is performed by the bus masters 101 and 102 functioning as a major portion of this access operation. The first-level bus controller 111 determines whether or not such a bus ownership is granted to which bus master in order to perform the memory access in response to a start signal of this memory access in case that there are plural bus masters, so that the first-level bus controller 111 controls the operation timing related to the data transfer of IAB and IDB. As a consequence, after the bus master has initiated the memory access, another process may be executed until the subsequent operation is instructed by the bus controller. Since the memory access itself is executed in a pipeline form, and moreover the execution control thereof is performed not by the bus master, but by the bus controller, the pipeline structure of the bus master need not be completely coincident with the pipeline structure of the memory access itself.

FIRST-LEVEL BUS BUFFER

Furthermore, the first level of hierarchical buses IAB and IDB are connected via the first-level bus buffer 112 to PAB (peripheral address bus) 123 and PDB (peripheral data bus) 124, which correspond to a second level of hierarchical buses. It should be understood that PAB corresponds to a second level of hierarchical address bus 123 and PDB corresponds to a second level of hierarchical data bus 124. The first-level bus buffer 112 can transfer the address in a uni-direction from IAB 113 to PAB 123, and can transfer the data in the bi-direction between IDB 114 and PDB 124.

SECOND-LEVEL BUS CONTROLLER

In case that an access request issued from the bus master causes the pipeline execution performed by the first-level of hierarchical bus to be delayed, the first-level bus controller 111 transfers the execution control of this access to the second-level bus controller 121. The first level buffer 112 transfers and fetches the address and the data requiring time lag. In other words, the second level of hierarchical buses 123 and 124 are connected to a low-speed memory 125 with a slow access speed, to peripheral function modules 126 and 127 whose access frequencies are low and which do not require high access speeds, and to the second-level bus buffer 122 and so on, to be further connected to a lower hierarchical bus, and also the access operations thereof are controlled by the second-level bus controller 121.

As described above, a scope for controlling the memory access operation by the second-level bus controller 121 is a circuit block 120, and the circuit block 120 corresponds to a scope directly connected by the bus PAB and the bus PDB.

That is, based on the information derived from the first-level bus controller, the second level of hierarchical buses PAB and PDB, and also the memory/peripheral modules connected to these buses can be separately controlled irrelevant to the first hierarchical execution control within a certain scope.

CONTROL FOR BUS CONTROL

As a result, the access requests of the bus masters 101 and 102 are first supplied to a first bus controller. The first-level bus controller 111 and the second-level bus controller 121 judge whether an object of this access request corresponds to the scope of the high-speed circuit block 110, the scope of the low-speed circuit block 120, or the scope of the further lower-speed circuit block at the lower level.

In other words, the above-described judgement may be performed by the controllers 111 and 121 based upon identification information which is contained in the access requests issued from the bus masters 101 and 102. The bus controllers 111 and 121 watch the access addresses issued from the bus masters 101 and 102 on the address bus, and can judge whether the object of the access request corresponds to the scope of the high-speed circuit block, the scope of the low-speed circuit, or the scope of the further lower-speed circuit block.

When the object of the access request corresponds to the scope of the high-speed circuit block 110, the bus buffers 112 and 122 are under non-operative condition, and the data transfer is carried out via the first level of hierarchical buses 112 and 114 between the bus master and the internal high-speed memory 115.

When the object of the access request corresponds to the scope of the low-speed circuit block 120, the bus master 112 is under operative condition, whereas the bus master 122 is under non-operative state, and also the data transfer between the bus master and either the low-speed memory 125, or the peripheral function units 126, 127 is performed via the first level of hierarchical buses 113, 114, the bus buffer 112, and the second level of hierarchical buses 123, 124.

When the object of the access request corresponds to the scope of the further lower-speed circuit block, the bus buffers 112 and 122 are brought into the operative conditions, and the data transfer between the bus master and the further lower-speed circuit is performed via the first level of hierarchical buses 113, 114, the bus buffer 112, the second level of hierarchical buses 123, 124, the bus buffer 122, and the further lower hierarchical bus.

In addition, in the system arrangement example shown in FIG. 1, even if there is only one bus master, the advantages of the present invention become effective, and also the advantages of the present invention become effective even when the bus hierarchy is only the first hierarchy, even when each hierarchy contains a plurality of hierarchical levels, or even when the respective bus hierarchical levels are built by equipped with a plurality of bus buffers in parallel.

ARRANGEMENT OF PIPELINE OF MEMORY ACCESS

Figure 2:
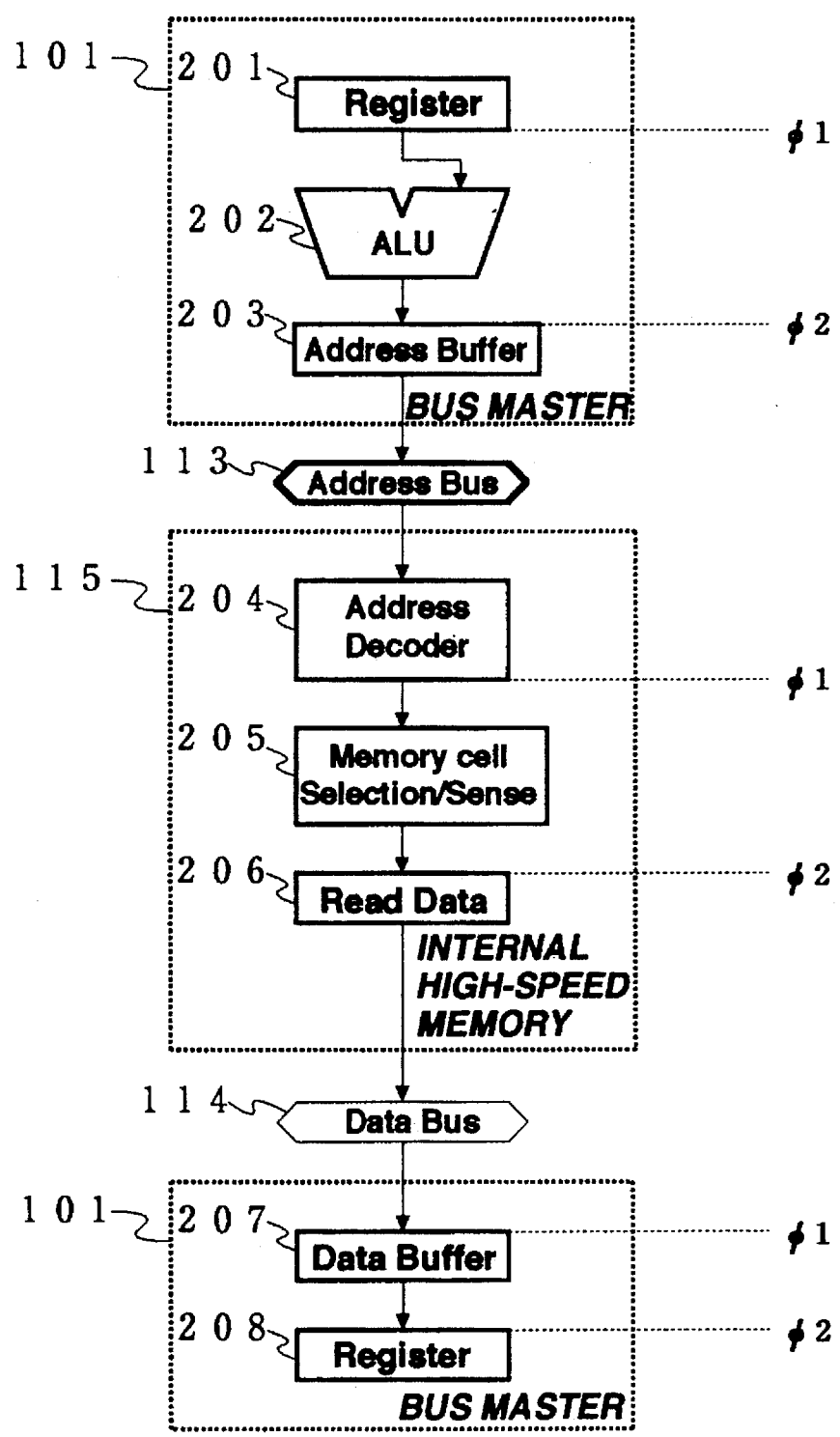
FIG. 2 schematically indicates a constructive diagram for explaining a pipeline operation of memory reading according to the embodiment of FIG. 1.

Referring now to FIG. 2 and the subsequent drawings, a pipeline execution of memory access and control methods for this pipeline execution will be described in detail.

First, a content of memory access processing operation will now be sequentially analyzed with respect to a read access with reference to FIG. 2.

The bus master 101 for executing the memory access calculates an address required for access. At this time, in case of the general processor, after a value of an address origin is read out from a certain register 201, and a desired address calculation is performed in an arithmetic logic unit (ALU) 202, the resultant address calculation (address) is stored in an address buffer 203. The address stored in the address buffer 203 is derived to an address bus 113 at proper timing, and normally, a read/write signal indicative of accessing sort is given to a memory 115 which is accessible.

On the side of the memory 115, the address has been received via the address bus 113, and thereafter this address is decoded by an address decoder 204. Then, a required memory element is selected based on this decoded information, a read out process 205 is carried out via a sense amplifier, and then the data read out by the data buffer 206 provided on the side of the memory is outputted to the data bus 114.

The bus master 101 which originally accesses, fetches the read data transferred on the data bus 114 into a data buffer 207 located on the side of the bus master, and stores this data into a desired register 208.

Among the above-described process contents, relatively longer workloads are the following two operations, namely the address calculation effected in the bus master, and the selection/read out operation defined after the address has been acquired into the memory and until the memory element is selected and the data is read out. As a consequence, generally speaking, as to these two operations, specific circuits are invented and optimized designs are made.

On the other hand, delay caused by the address buses and data buses per se, which connect the bus masters, the memories, and the peripheral modules, are not relatively negligible since performance of the modules has been improved. Even when the optimized designs have been made for the respective modules and each of these modules could be operated at high speeds, if no matching would be established at the interface unit, margin designs unnecessary for a speed aspect must be made, resulting in lowering of overall performance.

In accordance with this embodiment, a major aspect thereof is to realize balanced pipeline operation from the address calculation in the bus master up to the data acquisition. In FIG. 2, there is shown an example of pipeline stage allocation in case that 2-phase non-overlapped clocks $\phi 1$ and $\phi 2$ are employed as the system clock.

That is, the data is read out from the register 201 and sent to the arithmetic logic unit (ALU) 202 at timing of $\phi 1$, the calculated address is stored into the address buffer 203, and outputted to the address bus 113 at timing of $\phi 2$. Subsequently, this address is once latched at timing of o1 before and after the address decoder 204 of the memory 115. The read data is stored into the data buffer 206 and outputted into the data bus 114 at timing of $\phi 2$. Furthermore, the read data transferred on the data bus 114 is fetched by the data buffer 207 on the side of the bus master at timing of $\phi 1$, and furthermore is stored into the desired register 208 at timing of $\phi 2$.

The pipeline stage has been allocated to such an accessible high-speed memory 115, and the access time of the memory may be defined within a term from the rising time of $\phi 1$ until the falling time of $\phi 2$. Moreover, in this case, since the access time corresponds to a term purely defined from the selection of the memory element until readout of the data, except for the address decoding operation and the bus drive, higher operations than the conventional operations can be realized.

In other words, according to the pipeline control bus system of this embodiment, the high-speed operation can be done in such a manner that the delays caused by the address bus 113, the data bus 114, and the interface circuit are seemingly canceled. As a result, although the bus frequency band is improved, since a total number of pipeline stages involving the memory access in addition to the pipeline of the bus master itself is increased, it may be conceived that the combination number of control conditions is increased in order to entirely control, whereby the resultant pipeline control becomes complex. Also, since there are more or less such peripheral modules whose access frequencies are low and which need not be continuously accessed, there is a risk that a proper management for the buses becomes difficult.

To solve these problems, in accordance with this embodiment, as previously explained with reference to FIG. 1, the buses are made in a hierarchical structure, the bus masters correspond only to the interface of the topmost bus operable at the maximum speed, and the bus controllers are arranged for the respective lower hierarchical levels, whereby the bus masters never directly control the lower levels of hierarchical buses with lower speeds.

OPERATION OF PIPELINE OF MEMORY ACCESS

Then, an actual pipeline operation during memory access will now be explained with reference to an operation timing chart of FIG. 3.

Figure 3:
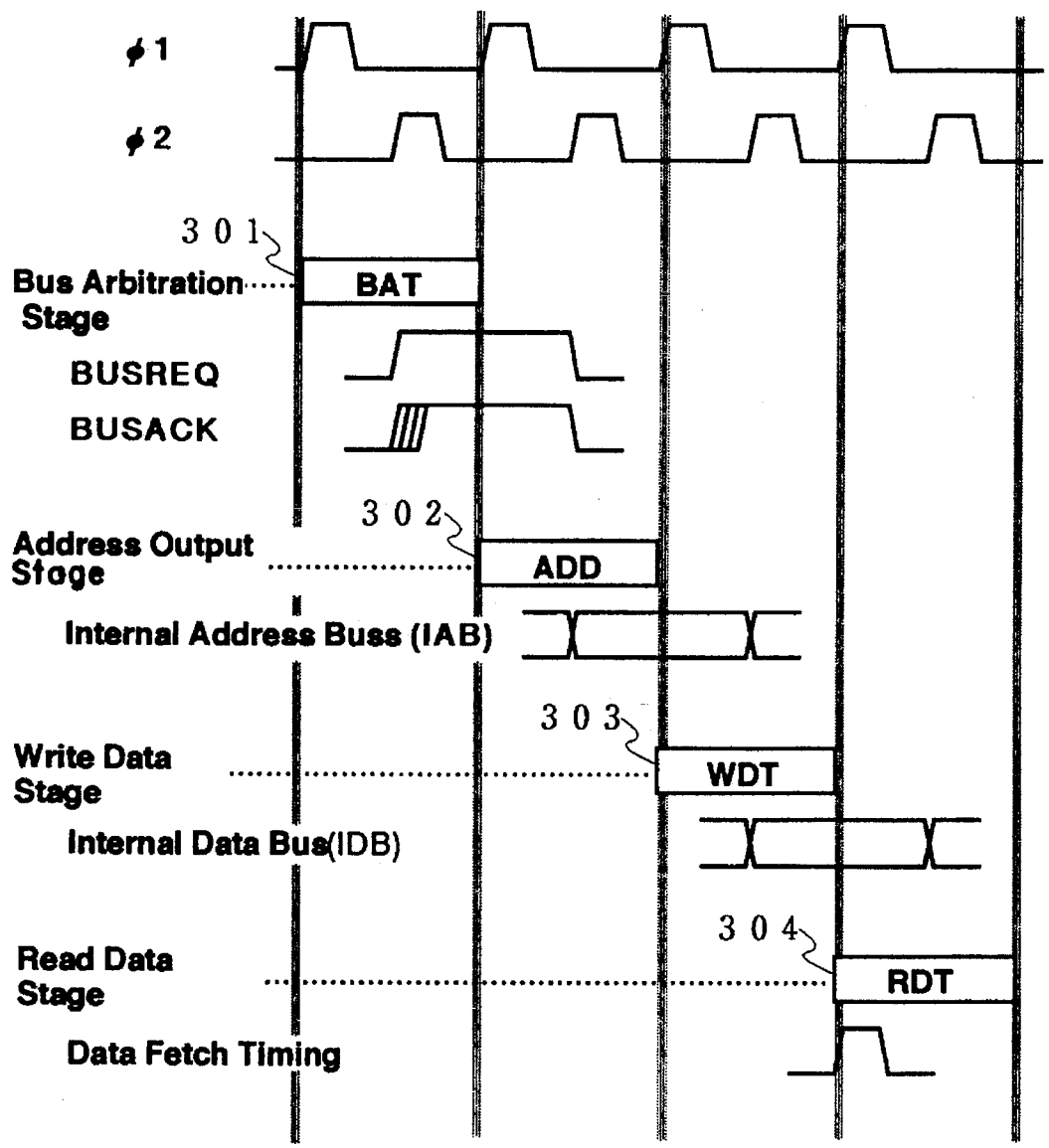
FIG. 3 is an explanatory diagram for explaining a pipeline operation control of a memory access according to the embodiment of FIG. 1.

As shown in FIG. 3, it is assumed that an access within the scope 110 connected by the first level of hierarchical bus shown in FIG. 1, is operated at 4-staged pipeline stages. That is, these pipeline stages are a bus arbitration stage 301, an address output stage 302, a write data stage 303, and a read data stage 304. Assuming now that all of these 4-staged pipelines are operated for 1 cycle, respectively, without any waiting time.

In the bus arbitration stage 301, a judgement is established as to whether or not the bus ownership is transferred to the bus master in response to a bus request signal "BUSREQ" outputted from this bus master at timing of φ2, and the bus ownership is managed by returning a bus acknowledge signal "BUSACK".

When the bus ownership is granted in this bus arbitration, the address can be outputted to the address bus IAB from the timing of φ2 within the next cycle. This is the address output stage 302.

Furthermore, in the next cycle, in case of write access, the write data for the address outputted to the address bus IAB in the previous cycle, is outputted to the data bus IDB from the timing of φ2. This is the write data stage 303, and in case of read access, the read data is outputted from the module accessed at the same timing.

In case of the read access, the read data outputted to the data bus IDB is fetched into the bus master at the timing of φ1 in the read data stage 304 of the next cycle. Also, in case of the write access, the write data outputted from the bus master to the data bus IDB is fetched into the data buffer accessed at the timing of o1 at the same read data stage 304.

In accordance with this pipeline control bus, the memory access within the scope 110 connected by the first level of hierarchical bus to which the bus master directly accesses, is operated in the four stages of pipeline, as previously explained, so that the continuous access band such as the memory can be increased two to three times. In particular, the bus arbitration is processed by the pipeline manner, so that the pipeline manner, so that the time required for transferring/fetching the bus ownership between the bus masters does not appear in fact. As a result, in such a system that transfers of the bus ownership frequently occur, the use efficiency of the buses can be improved, as compared with that of prior art. It should be understood that in case that there is only one bus master within the system, the bus arbitration stage in the above-described pipeline stages may be omitted.

CONTROL FOR PIPELINE OPERATION

Figure 4:
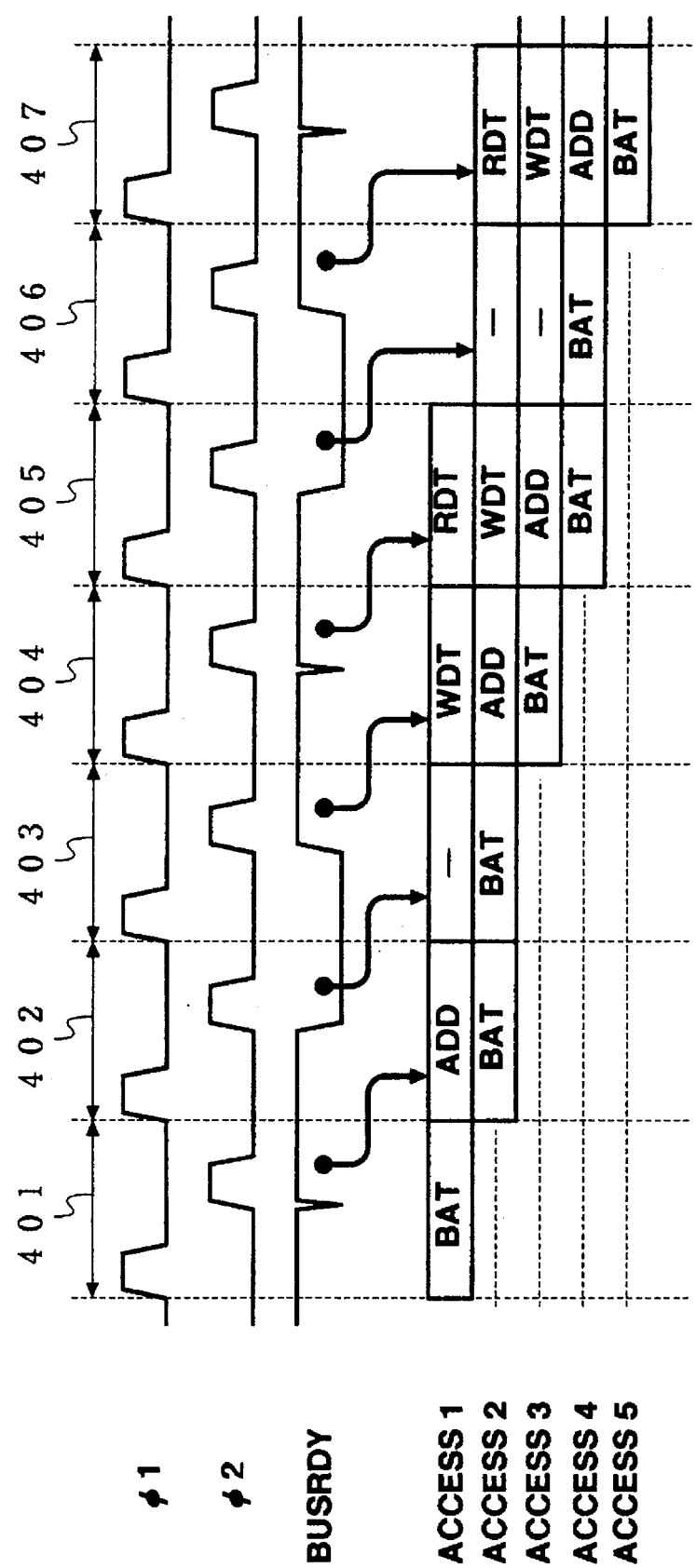
FIG. 4 is an explanatory diagram for explaining a pipeline operation control of a memory access according to the embodiment of FIG. 1.

Referring now to FIG. 4, an example of the above-explained control for the pipeline operation will be described.

The example of the pipeline operation control corresponds to such a control for simultaneously advancing, or suspending all of the four stages of pipeline operation. To achieve this control, only a single BUSRDY signal is sufficient. The BUSRDY signal is outputted at the timing of φ2 for every state, and a decision is made in the next state as to whether or not the pipeline operation of the bus is advanced.

This BUSRDY signal is produced based upon information related to a memory access space such as a data size and an access cycle number, and also information related to an access condition and a sort of access object. The BUSRDY signal is generated by the bus controller and supplied to the respective bus masters. The respective bus masters can recognize that the bus pipeline is advanced by 1 stage at a time instant when the BUSRDY signal is asserted in case that the relevant bus master is in the bus cycle on the halfway of accessing operation.

Next, a description will now be made of handling of bus ownerships during the pipeline operation.

The transfer/fetch of the bus ownership are performed at the first one stage of the pipeline operation in accordance with this embodiment. Thus, the bus request signal BUSREQ outputted from the bus master is effective only within 1 cycle term. Namely, in the bus controller, the bus acknowledge signal BUSACK is produced with respect to the bus request signal BUSREQ at this time instant for every cycle, and a right to use the bus pipeline of 1 access from the next cycle is granted to the bus master in which this BUSACK signal has been asserted. However, since the pipeline operation cannot be advanced unless the above-described BUSRDY signal, in face, no bus ownership is granted if both of the bus acknowledge signal BUSACK and BUSRDY signal are not asserted at the same time. Once the bus ownership is granted in this manner, the pipeline operations are sequentially executed in response to the BUSRDY signal.

In a cycle 401 of a basic clock shown in FIG. 4, since a bus arbitration stage BAT for executing a bus cycle called as an "access 1" is executed, thereby granting the bus ownership to the access 1, an address output stage ADD for executing the bus cycle of the access 1 is executed in the next cycle 402.

However, since the BUSRDY signal is negated in a cycle 402, the pipeline operation related to the bus cycle of the access 1 is lefted as in the address output stage also in the subsequent cycle 403, and thus the next pipeline operation cannot be executed.

On the other hand, as in the same cycle 402, the BUSRDY signal is negated though the bus arbitration stage BAT for executing a bus cycle called as an "access 2" is performed, this bus arbitration BAT becomes invalid. The bus arbitration BAT is newly reexecuted at a cycle 403.

In cycles 403 and 404, the BUSRDY signal is asserted. In the succeeding cycles 404 and 405, the data transfer with using the data bus is carried out in the bus cycle of the access 1. In the bus cycle of the access 2, after the address has been transferred, the data bus is used. Further in a cycle 404, the access 3 acquires the bus ownership, and the access 4 starts to execute the bus arbitration stage BAT from a cycle 405.

In the cycle 405, the BUSRDY signal is again negated, and the bus pipelines of the access 2 and the access 3 are brought into the wait conditions in the subsequent cycle 406, and then the access 4 acquires the bus ownership.

As previously explained, in accordance with this embodiment, the three access bus cycles are simultaneously executed in the pipeline manner at maximum. Also, according to this method, since the bus arbitration is similarly allocated to a single pipeline stage, this access may be executed by one bus master, or may be separately executed by the three bus masters. As a consequence, in accordance with this method, the respective access processes can be executed in the pipeline manner by that the three bus masters use the bus resource at the same time at maximum irrelevant to the bus arbitration.

Moreover, in the bus arrangement according to the present invention, as previously explained, under control of the pipeline control bus, the lower-level buses controlled by the exclusive-used bus controller can be constructed in a hierarchical form, and the bus interfaces can be freely built in conformity to the peripheral modules to be connected therewith.

PIPELINE OPERATION CONTROL OF HIERARCHICAL STRUCTURE BUS

Then, a description will now be made of one example for the pipeline operation control of the hierarchical structure bus with reference to FIG. 5.

Figure 5:
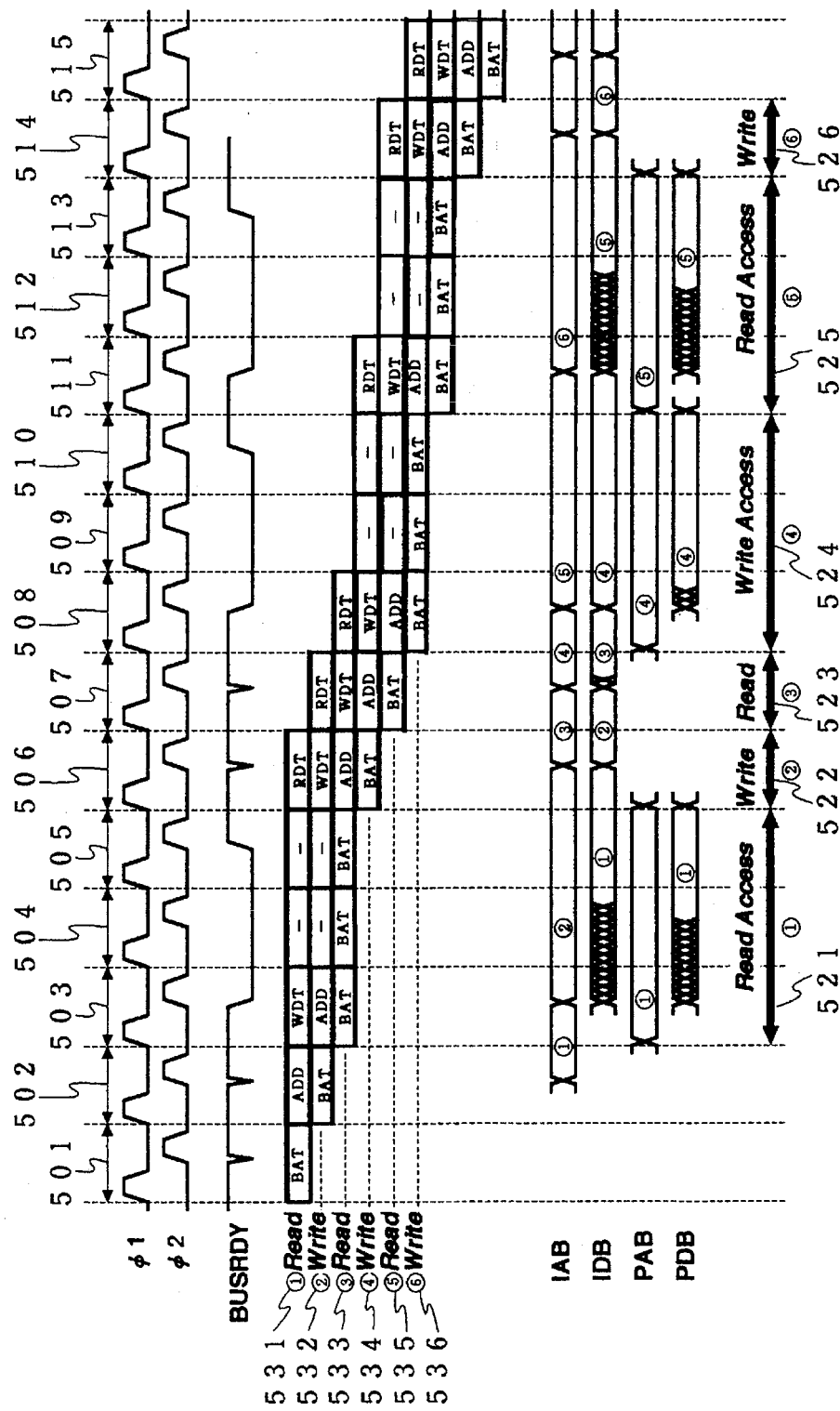
FIG. 5 is an explanatory diagram for explaining an example of a pipeline operation control for a hierarchical structure bus according to the embodiment of FIG. 1.

In FIG. 5, symbols IAB and IDB are the first level of hierarchical buses as previously explained in FIG. 1, and correspond to the first level of hierarchical address bus 113 and the first level of hierarchical data bus 114. Symbols PAB and PDB are the second level of hierarchical buses as previously explained in FIG. 1, and correspond to the second level of hierarchical address bus 123 and the second level of hierarchical data bus 124.

In FIG. 5, it is now assumed that six access operations 531 to 536 are prepared for access cycles with using the buses, in which the access operations 531 and 535 are read cycles with using the second level of hierarchical bus; the access operation 534 is a write cycle with using the second level of hierarchical bus; the access operations 532 and 536 are write cycles with employing the first level of hierarchical bus; and the access operation 533 is a read cycle with using the first level of hierarchical bus. Also, virtual bus cycles corresponding to the respective access operations 531 to 536 are cycle periods 521 to 526 of the basic clock.

A signal for controlling the pipeline operation of the bus is the BUSRDY signal, and the pipeline operation control in response to this BUSRDY signal has been explained with reference to FIG. 4.

In FIG. 5, the memory cycle executed via the second level of hierarchical bus is selected to be 3 cycles, and there is shown one example of an interface with the pipeline operation executed in the first level of hierarchical bus.

A wait control of the pipeline by the access operation 531 corresponds to the BUSRDY signal negated in the basic clock cycles 503 and 504; a wait control of the pipeline by the access control 534 corresponds to the BUSRDY signal negated in the basic clock cycles 508 and 509; and a wait control of the pipeline by the access control 535 corresponds to the BUSRDY signal negated in the basic clock cycles 511 and 512.

In other words, in the wait control at the first access operation 531 corresponding to the read cycle with using the low-speed second level of hierarchical bus, since the first-level bus buffer 112 transfers the address on IAB to PAB and also holds the address during three cycles of the basic clock, and further the data can be transferred between IDB and PDB in bi-direction, the data are read out from the devices connected to the second level of hierarchical bus during the above-mentioned cycles, and then are read in the bus master via the second level of hierarchical bus, the first-level bus buffer, and the first level of hierarchical bus.

In the second access operation 532 corresponding to the write cycle with using the high-speed first level of hierarchical bus, although the address output stage ADD is prolonged by 2 cycles by receiving the influences of two-cycle wait control at the first access operation 531, the write operation is completed for 1 cycle of the basic clock after the wait control is ended.

In the third access operation 533 corresponding to the read cycle with employing the high-speed first level of hierarchical bus, although the bus arbitration BAT is prolonged by 2 cycles by receiving the influences of the two-cycle wait control at the first access operation 531, the read operation is completed for the two cycles of the basic clock after the wait control is ended.

Under the wait control at the fourth access operation 534 corresponding to the write cycle with employment of the low-speed second level of hierarchical bus, the first-level bus buffer 112 transfers the address on the IAB to PAB and holds the address during three cycles of the basic clock, and also can transfer the data between IDB and PDB in bi-direction. As a consequence, during this period, the data are transferred from the bus master to the device connected to the second level of hierarchical bus via the first level of hierarchical bus, the first-level bus buffer, and the second level of hierarchical bus, and then are written into a memory if this device is this memory.

While the present invention has been described in detail with reference to the typical embodiment, it is apparent that the present invention is not limited to this embodiment, but may be modified within the technical scope of the present invention.

For instance, an SRAM (static random access memory) may be utilized as the internal high-speed memory 115, whereas a DRAM (dynamic random access memory), an EPROM (electrically programmable read-only memory) and other memory devices may be employed as the low-speed memory 125.

Although the number of wait cycle to access the low-speed second level of hierarchical bus was 2 in this embodiment, a similar advantage thereto may be achieved even if the cycle number would be varied in conformity to the speed of the device of the second level bus.

It is particularly suitable to apply the present invention to an ASIC (application specific IC) in which a processor such as a microcomputer is built on a chip, and a high-speed memory, a low-speed memory, and peripheral functional units are optimized in order to achieve target performance for a customer under optimum condition.

According to the present invention, it is possible to provide such a bus operation method for a microcomputer system capable of increasing the effective operation speeds of the buses, memories, and peripheral function units, capable of simplifying the bus interface provided on the side of the bus master, and further capable of readily changing the interface specifications for the memory and peripheral function unit without modifying the interface circuit provided on the side of the bus master.

What is claimed is:

1. A microcomputer system comprising:

a plurality of bus masters;

a first address bus to which an address from a bus master is transferred;

a first data bus to which data from said bus master is transferred;

a high-speed memory coupled with the first address bus and the first data bus;

a first bus buffer coupled with the first address bus and the first data bus;

a second address bus coupled via the first bus buffer to the first address bus;

a second data bus coupled via the first bus buffer to the first data bus;

a low-speed device coupled with the second address bus and the second data bus; and a bus controller for granting bus ownership of the first address bus and said first data bus in response to an access request issued from said bus master;

wherein said bus controller controls execution of pipeline operation on said first address bus and said first data bus with respect to said access request, and said pipeline operation includes a bus arbitration stage, an address output stage and a data read/write stage; and said bus controller controls said bus master and said first bus buffer in such a manner that when an access object of said access request from said bus master is said low-speed device, said bus ownership of said first address bus, said first data bus, said second address bus and said second data bus is granted to said bus master to suspend subsequent pipeline operation on said first address bus and said first data bus, and said first bus buffer holds said address of said first address bus for a predetermined cycle, thereby transferring said address to said second address bus.

2. A microcomputer system as claimed in claim 1, further comprising:

a second bus buffer coupled to said second address bus and said second data bus; and a further lower hierarchical address bus and a lower hierarchical data bus, which are coupled via said second bus buffer to said second address bus and said second data bus.

3. A microcomputer system as claimed in claim 1, wherein said low-speed device is one of a low-speed memory and a peripheral function unit.

4. A microcomputer system as claimed in claim 2, wherein said low-speed device is one of a low-speed memory and a peripheral function unit.

5. A microcomputer system comprising:

a plurality of bus masters, each bus master outputting an address, and executing pipeline operation with respect to an access request of said bus master and said outputting of said address;

a first address bus to which an address from said bus master is transferred;

a first data bus to which data from said bus master is transferred;

a high-speed memory coupled with the first address bus and the first data bus, said high-speed memory being arranged in such a manner that pipeline operation is executed with respect to a memory selecting operation and data read from said selected memory, said pipeline operation includes a bus arbitration stage, an address output stage and a data read/write stage;

a first bus buffer coupled with the first address bus and the first data bus;

a second address bus coupled via the first bus buffer to the first address bus;

a second data bus coupled via the first bus buffer to the first data bus;

a low-speed device coupled with the second address bus and the second data bus; and a bus controller for granting bus ownership of the first address bus and said first data bus in response to said access request issued from said bus master, and including means for suspending said pipeline operation of said bus master;

wherein said bus controller controls execution of said pipeline operation on said first address bus and said first data bus and controls said bus master and said first bus buffer in such a manner that when an access object of said access request from said bus master is said low-speed device, said bus ownership of said first address bus, said first data bus, said second address bus and said second data bus is granted to said bus master to suspend subsequent pipeline operation on said first address bus and said first data bus in response to said means for suspending included in said bus controller, and said first bus buffer holds said address of said first address bus for a predetermined cycle, thereby transferring said address to said second address bus.

6. The microcomputer system according to claim 5, further comprising:

a second bus buffer coupled to said second address bus and said second data bus; and a further lower hierarchical address bus and a lower hierarchical data bus, which are coupled via said second bus buffer to said second address bus and said second data bus.

7. The microcomputer system according to claim 5, wherein said low-speed device is one of a low-speed memory and a peripheral function unit.

8. The microcomputer system according to claim 6 wherein said low-speed device is one of a low-speed memory and a peripheral function unit.

9. A microcomputer system comprising:

a plurality of bus masters;

a first address bus to which an address from a bus mater is transferred;

a first data bus to which data from said bus master is transferred;

a high-speed memory coupled with said first address bus and said first data bus;

a first bus buffer coupled with said first address bus and said first data bus;

a second address bus coupled via said first bus buffer to said first address bus;

a second data bus coupled via said first bus buffer to said first data bus;

a low-speed device coupled with said second address bus and said second data bus; and a bus controller for granting bus ownership of said first address bus and said first first data bus, in response to an access request issued from each of the bus masters;

wherein said bus controller controls execution of pipeline operation on said first address bus and said first data bus with respect to said access request, said pipeline operation includes a bus arbitration stage, an address output stage and a data read/write stage.

* * * * *